(12) United States Patent
Wasserblant et al.

(10) Patent No.: US 7,788,095 B2
(45) Date of Patent: Aug. 31, 2010

(54) METHOD AND APPARATUS FOR FAST SEARCH IN CALL-CENTER MONITORING

(75) Inventors: Moshe Wasserblant, Maccabim (IL); Barak Eilam, Raanana (IL); Yuval Lubowich, Raanana (IL); Maor Nissan, Herzliya (IL)

(73) Assignee: Nice Systems, Ltd., Raanana (IL)

( * ) Notice: Subject to any disclaimer, the term of this patent is extended or adjusted under 35 U.S.C. 154(b) by 4 days.

(21) Appl. No.: 11/941,947

(22) Filed: Nov. 18, 2007

(65) Prior Publication Data

US 2009/0150152 A1 Jun. 11, 2009

(51) Int. Cl.
*G10L 15/04* (2006.01)
*G10L 15/06* (2006.01)
*G10L 15/26* (2006.01)
*G10L 15/28* (2006.01)
*G10L 15/14* (2006.01)
*G10L 17/00* (2006.01)

(52) U.S. Cl. .................. 704/251; 704/235; 704/246; 704/250; 704/255; 704/256.6

(58) Field of Classification Search ......... 704/231–257, 704/270–27, 275, E15.001–E15.05
See application file for complete search history.

(56) References Cited

U.S. PATENT DOCUMENTS

| | | | | |
|---|---|---|---|---|
| 5,457,768 A | * | 10/1995 | Tsuboi et al. | 704/231 |
| 5,526,259 A | * | 6/1996 | Kaji | 704/3 |
| 5,749,066 A | * | 5/1998 | Nussbaum | 704/232 |
| 6,073,098 A | * | 6/2000 | Buchsbaum et al. | 704/255 |
| 6,243,679 B1 | * | 6/2001 | Mohri et al. | 704/256.8 |
| 6,397,181 B1 | * | 5/2002 | Li et al. | 704/256.4 |
| 6,502,073 B1 | * | 12/2002 | Guan et al. | 704/255 |
| 6,694,296 B1 | * | 2/2004 | Alleva et al. | 704/255 |
| 6,882,970 B1 | * | 4/2005 | Garner et al. | 704/236 |
| 6,954,745 B2 | * | 10/2005 | Rajan | 706/22 |
| 7,092,883 B1 | * | 8/2006 | Gretter et al. | 704/242 |
| 7,181,398 B2 | * | 2/2007 | Thong et al. | 704/254 |
| 7,209,882 B1 | * | 4/2007 | Cosatto et al. | 704/235 |
| 7,219,058 B1 | * | 5/2007 | Rose et al. | 704/238 |
| 7,295,980 B2 | * | 11/2007 | Garner et al. | 704/254 |
| 2002/0022960 A1 | * | 2/2002 | Charlesworth et al. | 704/251 |
| 2002/0048350 A1 | * | 4/2002 | Phillips et al. | 379/88.01 |
| 2002/0055913 A1 | * | 5/2002 | Rajan | 706/19 |
| 2003/0187643 A1 | * | 10/2003 | Van Thong et al. | 704/254 |
| 2003/0191625 A1 | * | 10/2003 | Gorin et al. | 704/1 |

(Continued)

OTHER PUBLICATIONS

Dhranipragada, et al. "A Multistage Algorithm for Spotting New Words in Speech." IEEE Transactions on Speech and Audio Processing, vol. 10, No. 8. Nov. 2002.*

*Primary Examiner*—David R Hudspeth
*Assistant Examiner*—David Kovacek
(74) *Attorney, Agent, or Firm*—Ohlandt, Greeley, Ruggiero & Perle, L.L.P.

(57) ABSTRACT

A method and apparatus for indexing one or more audio signals using a speech to text engine and a phoneme detection engine, and generating a combined lattice comprising a text part and a phoneme part. A word to be searched is searched for in the text part, and if not found, or is found with low certainty is divided into phonemes and searched for in the phoneme parts of the lattice.

18 Claims, 4 Drawing Sheets

U.S. PATENT DOCUMENTS

| | | | |
|---|---|---|---|
| 2004/0193408 A1* | 9/2004 | Hunt | 704/209 |
| 2006/0264209 A1* | 11/2006 | Atkinson et al. | 455/422.1 |
| 2007/0038450 A1* | 2/2007 | Josifovski | 704/255 |
| 2007/0100618 A1* | 5/2007 | Lee et al. | 704/238 |
| 2007/0127688 A1* | 6/2007 | Doulton | 379/265.01 |
| 2007/0143110 A1* | 6/2007 | Acero et al. | 704/251 |
| 2008/0270344 A1* | 10/2008 | Yurick et al. | 707/2 |

* cited by examiner

METHOD AND APPARATUS FOR FAST SEARCH IN CALL-CENTER MONITORING

TECHNICAL FIELD

The present invention relates to the field of speech analysis in general, and to an apparatus and method for fast search on stored communication, in particular.

BACKGROUND

Within organizations or organizations' units that handle interactions with customers, suppliers, employees, colleagues or the like, it is often required to extract information from the interactions in an automated and efficient manner. The organization can be for example a call center, a customer relations center, a trade floor, a law enforcements agency, a homeland security office, or the like. The interactions may be of various types which may particularly include an audio part, such as phone calls using all types of phone systems, recorded audio events, walk-in center events, video conferences, chats, captured web sessions, audio segments downloaded from the internet, audio files or streams, the audio part of video files or streams or the like.

The interactions received or handled by an organization constitute a rich source of customer related information, product-related information, or any other type of information which is significant for the organization. However, searching through the information in an efficient manner is typically a problem. A call center or another organization unit handling interactions receives a large amount of interactions which contain a vocal part, mainly depending on the number of employed agents. Listening, viewing or otherwise searching through a significant percentage of the interactions would require time and manpower of the same order of magnitude that was required for the initial handling of the interaction, which is apparently impractical. Currently used search mechanisms include phonetic indexing and search, and word-based indexing and search. Phonetic indexing requires significant storage space, in the order of magnitude of the audio input and it is less accurate than word-based speech-to-text. However, the search is not limited to words appearing in a dictionary or lexicon according to which indexing was done, and any word can be searched within indexed segments, including words that were not known at the time of the indexing. This can happen, for example with new competitor product names which are mentioned by customers prior to being entered as part of the dictionary according to which audio signals are indexed. In addition, the users, such as business-intelligence departments supply the searched terms in words rather than in phonemes, thus the indexed phonemes are actually inaccessible. Word-based indexed data, generated by a speech-to-text engine using a predetermined dictionary on the other hand, is easier to search but the indexing time requirements and error rate are high, especially on low quality input. In addition, only words that were included in the lexicon according to which the segments were indexed can be searched for.

There is therefore a need in the art for a system and method for enabling indexing and search within audio signals. The method and apparatus should enable fast, efficient, high quality, and accessible results.

SUMMARY

The disclosure relates to a method and apparatus for searching words in indexed audio signals. The method and apparatus construct a text lattice and phoneme lattice so that words can be searched as a whole in the text lattice, or they can be divided into phonemes and searched in phoneme lattice.

An aspect of an embodiment of the disclosure relates to an apparatus for detecting one or more words in one or more audio signals, the apparatus comprising a computing platform executing: a phonetic and text decoding component for generating from each audio signal a combined lattice, the combined lattice comprising a text part and a phoneme part; and a search component for searching for the one or more words within the combined lattice. Within the apparatus, the search component optionally comprises a text search component for searching for one words within the text part of the combined lattice and generating a first search result; a grapheme to phoneme converter for extracting one or more phonemes from the word; a phonetic sequence search component for searching for the one or more phonemes within the phoneme part of the combined lattice and generating a second search result; and a fusion component for fusing the first search result with the second search result. Within the apparatus, the phonetic and text decoding component can comprise a speech to text engine for detecting an indexed word in a part of one of the audio signals; a phoneme detection engine for detecting an indexed phoneme in a part of the audio signal; and a phoneme and text lattice generator for generating the combined lattice from the indexed word and the indexed phoneme. Within the apparatus, the text part of the combined lattice is optionally further divided into phonemes. The apparatus can further comprise a training component for generating a phoneme model to be used by the phonetic and text decoding component and the search component. The apparatus can further comprise one or more speech analytics components for performing advanced analysis on a result produced by the search component. The speech analytics components optionally comprise one or more items selected from the group consisting of: category ranking component; trend detection component; and root cause analysis component. The apparatus can further comprise a storage device for storing the combined lattice. The apparatus optionally comprises a capturing or logging component for capturing the audio signals, and a presentation device for outputting the first search result fused with the second search result. The apparatus can further comprise a quality monitoring component for monitoring one or more aspects of the audio signal or of the combined lattice.

Another aspect of the disclosure relates to a method for detecting one or more words in one or more audio signals, the method comprising lattice generation steps for generating from the audio signals a combined lattice, the combined lattice comprising one or more text parts and one or more phoneme parts; and searching steps for searching for the one or more words within the combined lattice. Within the method, the searching steps can comprise the steps of: searching for the one or more words within the text part of the combined lattice and generating one or more first search results if any of the one or more words were found within the text part of the combined lattice; converting one or more of the words into one or more phonemes; searching for is the phonemes within the phoneme part of the combined lattice and generating one or more second search results if the phoneme was found within the phoneme part of the combined lattice; and if there is a first search result and a second search result, fusing the first search result with the second search result. The method optionally comprises the step of searching the word in a dictionary. Within the method, converting the one or more words into one or more phonemes is optionally done using a rule-based text-to-phoneme model. Within the method, the lattice generation steps optionally comprise: a step of performing speech to text analysis on one or more parts of the one or more audio signals, to detect one or more indexed words within the parts of the audio signals; a step of performing phoneme detection on one or more parts of the audio signals, to detect one or more indexed phonemes within the parts of the audio signals; and generating a combined lattice from the indexed words and the indexed phonemes. The method can further comprise the step of dividing indexed words into phonemes. The method can further comprise a training step for generating one or more phoneme models to be used by the lattice generation steps and the search steps. The method optionally comprises one or more speech analytics steps for performing advanced analysis on one or more results produced by the search component. The speech analytics step optionally comprises one or more items selected from the group consisting of: categorization; trend detection; root cause analysis; link analysis; hidden pattern analysis and contextual analysis.

BRIEF DESCRIPTION OF THE DRAWINGS

Non-limiting embodiments of the invention will be described with reference to the following description of exemplary embodiments, in conjunction with the figures. The figures are generally not shown to scale and any sizes are only meant to be exemplary and not necessarily limiting. In the figures, identical structures, elements or parts that appear in more than one figure are preferably labeled with a same or similar number in all the figures in which they appear, in which.

DETAILED DESCRIPTION

The disclosed subject matter enables efficient and accessible indexing and search within audio signals, for organizations in which it is required to search for information within the audio signal. A training phase is disclosed, in which the characteristics of the environment are studied, including for example language, lexicon, accent, acoustic models, noise levels and others. Then, audio signals, including for example captured phone interactions, voice over IP interactions, audio part of video communications, recordings of walk-in sessions or others, are indexed. The product of the indexing is a combination of word lattice as generated by speech-to-text engines, and phoneme lattice as produced by a phoneme indexing engine. The indexing is performed so as to minimize resource consumption and maximize accuracy. For example, high quality parts of the audio signals are indexed by the speech-to-text (S2T) engine which produces a more compact lattice, while lower quality parts, which would yield high error rate if indexed by an S2T engine, are indexed by the phoneme indexing engine, which produces a higher quality lattice, but requires more space. The combined lattice can comprise phoneme lattice parts and word-lattice part, wherein each area comprises an indication to a time within the audio signal. Alternatively, one, multiple or all words in the word lattice can be divided into phonemes, thus generating a phoneme lattice but with the advantages of word lattice, i.e. smaller storage space and a unique combination. Once the audio signals are indexed, they can be searched. A search term is generally introduced in the form of words. Then, it is possible to search for the words within the words lattice. Alternatively, the words can be transformed into a sequence of phonemes which can be searched in the phoneme lattice, thus enabling finding misspelled words which sound similar. In yet another embodiment, the words can be searched, and if none are found, or a low certainty match is found, then phoneme search is executed. In another alternative, the words and the phoneme representations can be searched both in the word lattice and in the phoneme lattice, and one or more results having the highest scores are selected. In yet another alternative, it is possible to search also for words which are similar in spelling to the searched words, while taking into account the similarity in spelling between the two words. For example, when searching for the word "table", the word "cable" which differs only in one letter will also be searched. If the word "maple" is searched too, then the scores associated with the word "cable" will be higher than the score of the word "maple".

Optionally, once one or more words are found, either as words or as phoneme sequences, additional analysis can be performed, such as trend detection for finding trends, such as a raise in the frequency of a competitor's name; categorization of interactions into categories according to subjects or another factor, root cause analysis for detecting causes of phenomenon exhibited by detected words or terms, or the like.

Figure 1:
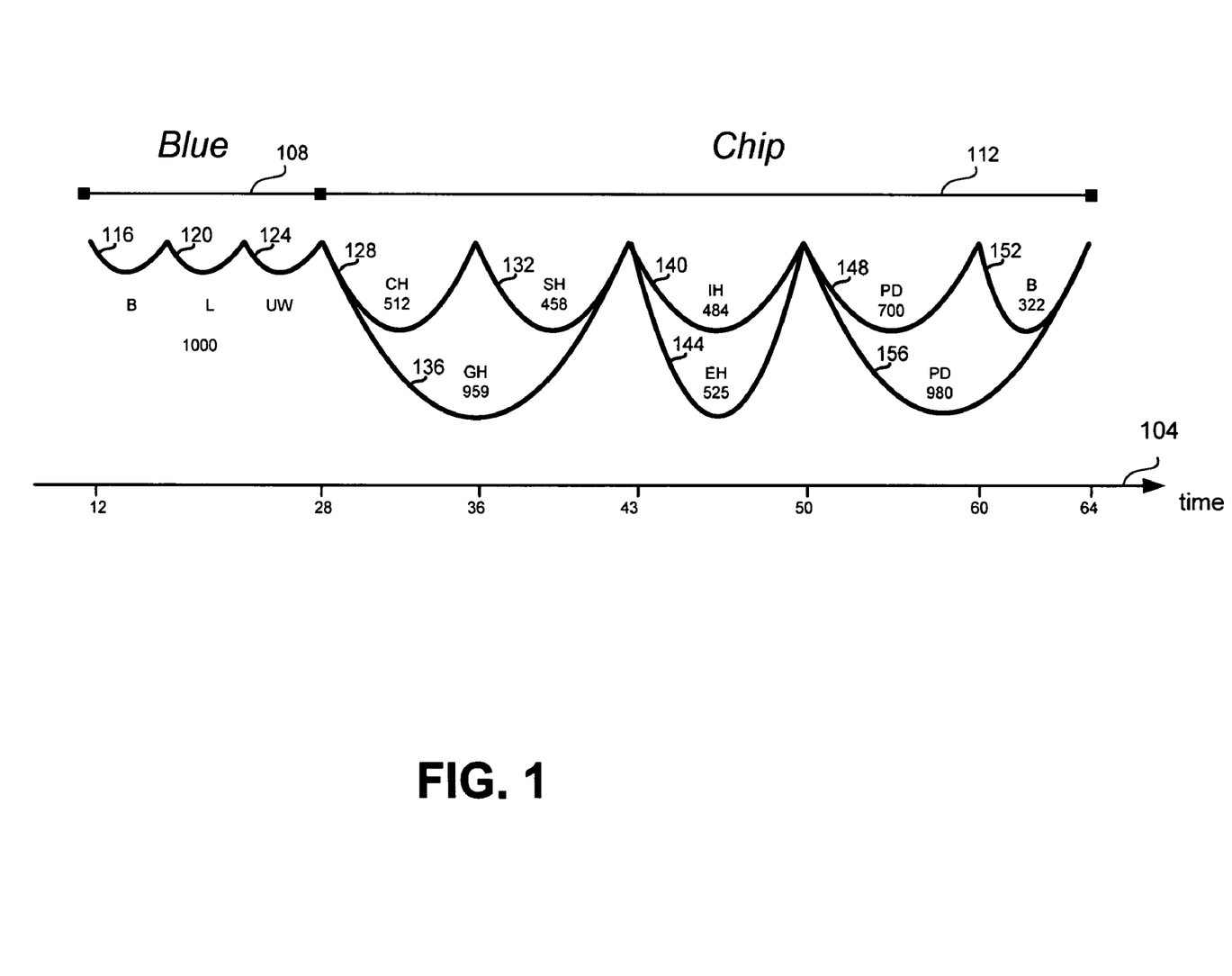
FIG. 1 is a schematic graphic illustration of a combined lattice, in accordance with the current disclosure.

Referring now to FIG. 1, showing a visual illustration of a combined lattice. An audio signal containing the word combination "blue chip" was analyzed. Each word or phoneme is detected with a certain certainty level, for example in the range of 0 to 1000. In FIG. 1, the word "blue" was spotted with a certainty level of 1000 between time stamps 12 and 28 as indicated by time line 104. The word "blue" is optionally divided into the phonemes of "b" (116), "l" (120) and "uw" (124), which will enable phonetic search although the word was detected by a speech-to-text engine. The rest of the signal provided lower certainty when processed by a speech-to-text engine, so a phoneme indexing engine was used, which produced the following results: between time 12 and time 36 the phoneme "ch" (128) was detected with certainty of 512, followed by the phone "sh" (132) between time 36 and time 43 with certainty level of 458. Alternatively, the phone "gh" (136) was detected with certainty of 959. Then between times 43 and 50 the phoneme "ih" was detected with certainty of 484, and alternatively the phoneme "eh" (144) was detected with certainty of 525. Then, between time 50 and time 60 the phoneme "pd" (148) was detected with certainty of 700, followed by the phone "b" (152) between time 60 and time 64 with certainty level of 322. Alternatively, the phone "pd" (156) was detected with certainty of 980 between time 50 and time 64. Thus, the lattice will return provides all combinations that contain "blue", followed by "ch"+"sh" or "gh", followed by "ih" or "eh", followed by "pd"+"b" or "pd".

Figure 2:
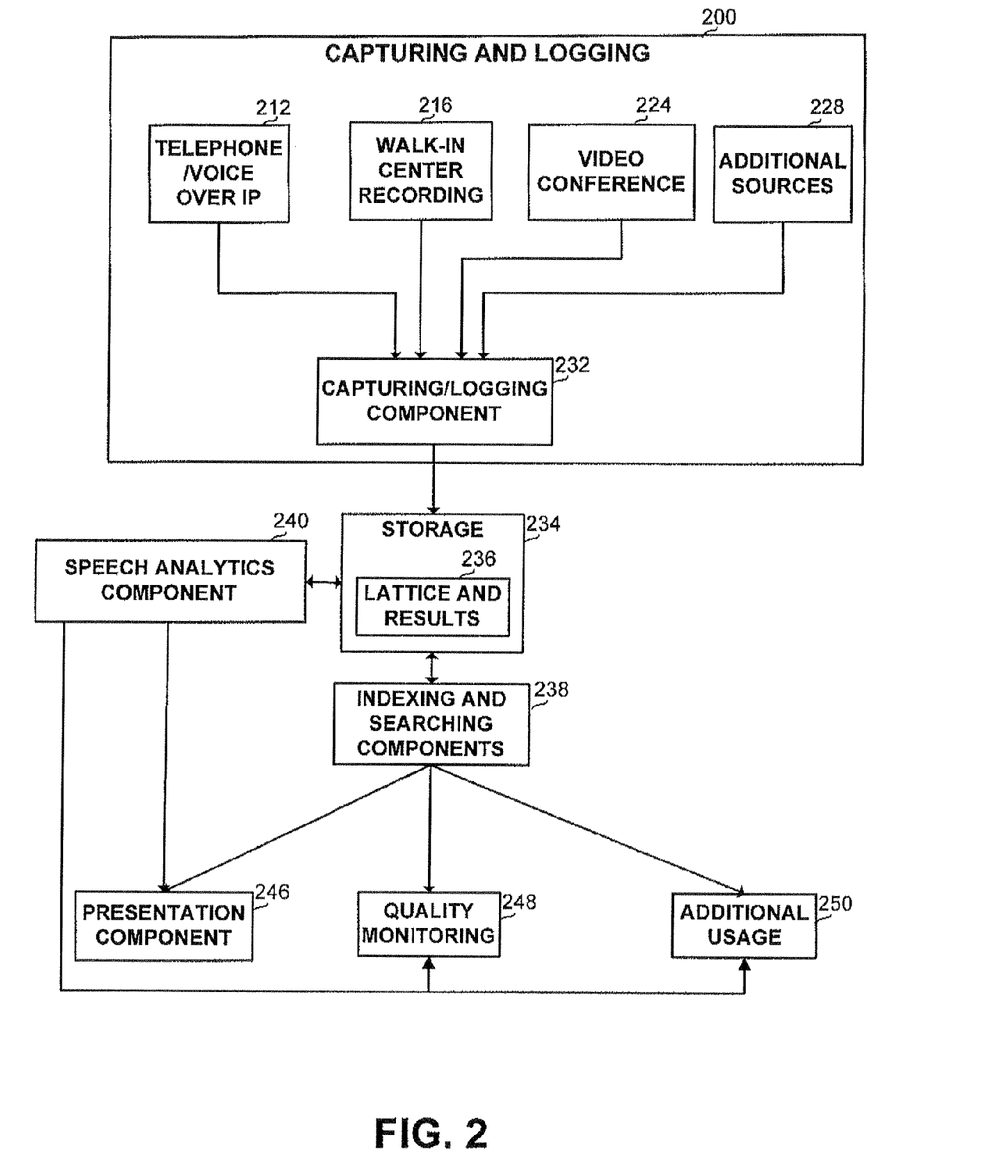
FIG. 2 is a block diagram of the main components in a typical environment in which the disclosed method and apparatus are used.

Referring now to FIG. 2, showing a typical environment in which the disclosed apparatus and methods are used.

The environment is preferably an interaction-rich organization, typically a call center, a bank, a trading floor, an insurance company or another financial institute, a public safety contact center, an interception center of a law enforcement organization, a service provider, an internet content delivery company with multimedia search needs or content delivery programs, or the like, Segments, including broadcasts, interactions with customers, users, organization members, suppliers or other parties are captured, thus generating input information of various types. The information types optionally include auditory segments, non-auditory segments and additional data. The capturing of voice interactions, or the vocal part of other interactions, such as video, can employ many forms and technologies, including trunk side, extension side, summed audio, separate audio, various encoding and decoding protocols such as G729, G726, G723.1, and the like. The vocal interactions usually include telephone or voice over IP sessions 212. Telephone of any kind, including landline, mobile, satellite phone or others is currently the main channel for communicating with users, colleagues, suppliers, customers and others in many organizations. The voice typically passes through a PABX (not shown), which in addition to the voice of two or more sides participating in the interaction collects additional information discussed below. A typical environment can further comprise voice over IP channels, which possibly pass through a voice over IP server (not shown). It will be appreciated that voice messages are optionally captured and processed as well, and that the handling is not limited to two- or more sided conversation. The interactions can further include face-to-face interactions, such as those recorded in a walk-in-center 216, the vocal part of video conferences 224, and additional sources of data 228, such as microphone, intercom, vocal input by external systems, broadcasts, files, or any other source. Data from all the above-mentioned sources and others is captured and preferably logged by capturing/logging component 232. Capturing/logging component 232 comprises a computing platform running one or more computer applications as is detailed below. The captured data is optionally stored in storage 234 which is preferably a mass storage device, for example an optical storage device such as a CD, a DVD, or a laser disk; a magnetic storage device such as a tape, a hard disk, Storage Area Network (SAN), a Network Attached Storage (NAS), or others; a semiconductor storage device such as Flash device, memory stick, or the like. The storage can be common or separate for different types of captured segments and different types of additional data. The storage can be located onsite where the segments or some of them are captured, or in a remote location. The capturing or the storage components can serve one or more sites of a multi-site organization. A part of, or storage additional to storage 234 is storage 236 which stores the lattice generated from the input sources, and results of searching for words or terms within the lattice. Storage 234 can comprise a single storage device or a combination of multiple devices. Indexing and searching components 238 generate the lattice from the input audio and perform the search over the lattice. The apparatus further comprises optional speech analytics component 240 for performing additional analysis on the search results or other data associated with the results, the organizations or other entities. Indexing and searching components 238 and speech analytics component 240 are further detailed in association with FIG. 3 below.

The results of indexing and searching components 238 and optionally of speech analytics component 240 are preferably sent to presentation component 246 for presentation in any way the user prefers, including for example various graphic representations, textual presentation, table presentation, or the like, and can be transferred in any required method, including showing on a display device, sending a report, or others. The results can further be transferred to and analyzed by a quality monitoring component 248, for monitoring one or more aspects of a participant in an interaction, a product, line of products, the signal, the lattice, or the like. The results are optionally transferred also to additional usage components 250, if required. Such components may include playback components, report generation components, alert generation components, or others.

Figure 3:
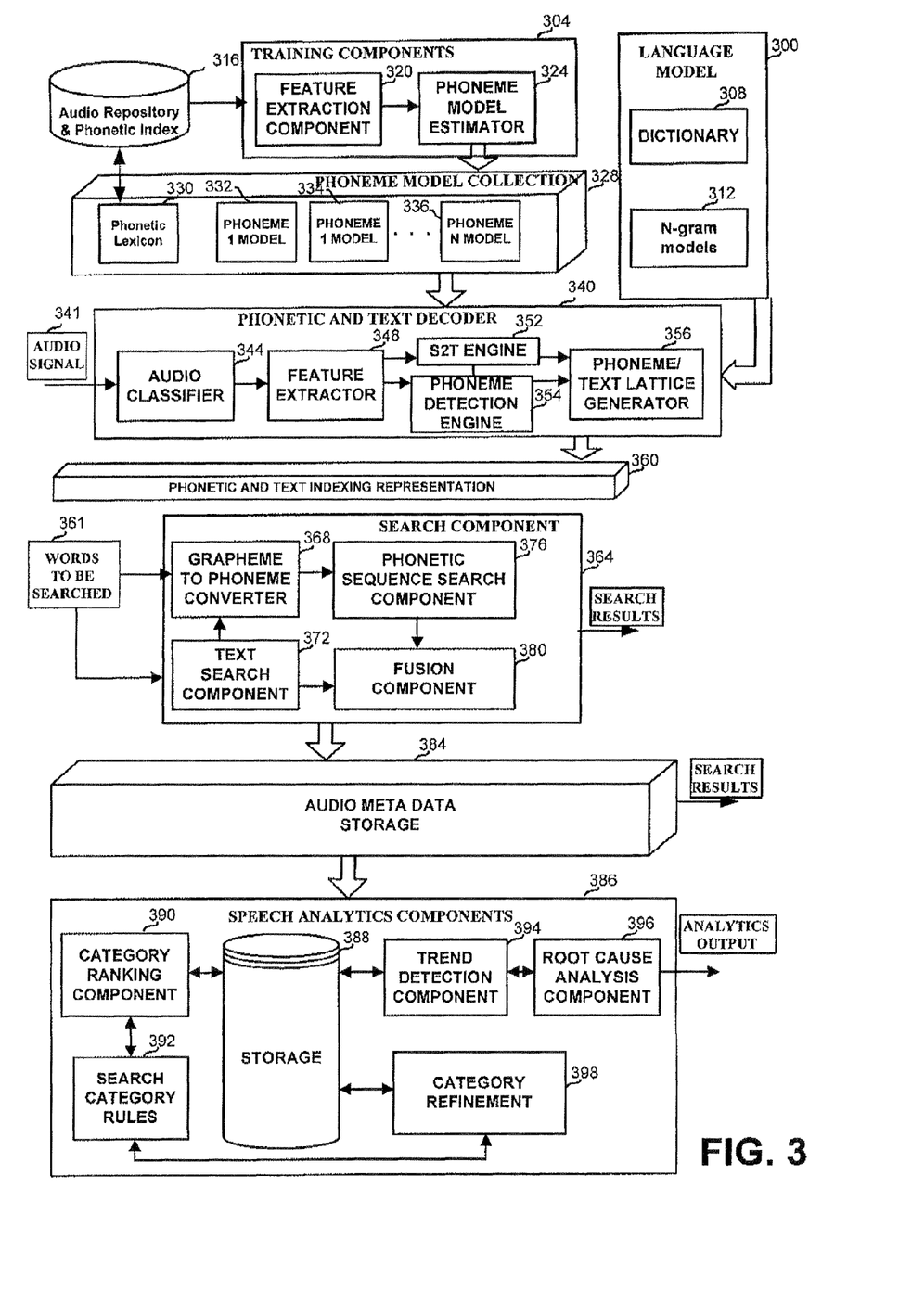
FIG. 3 is a schematic block diagram of an apparatus according to a preferred implementation of the disclosure.
Figure 4:
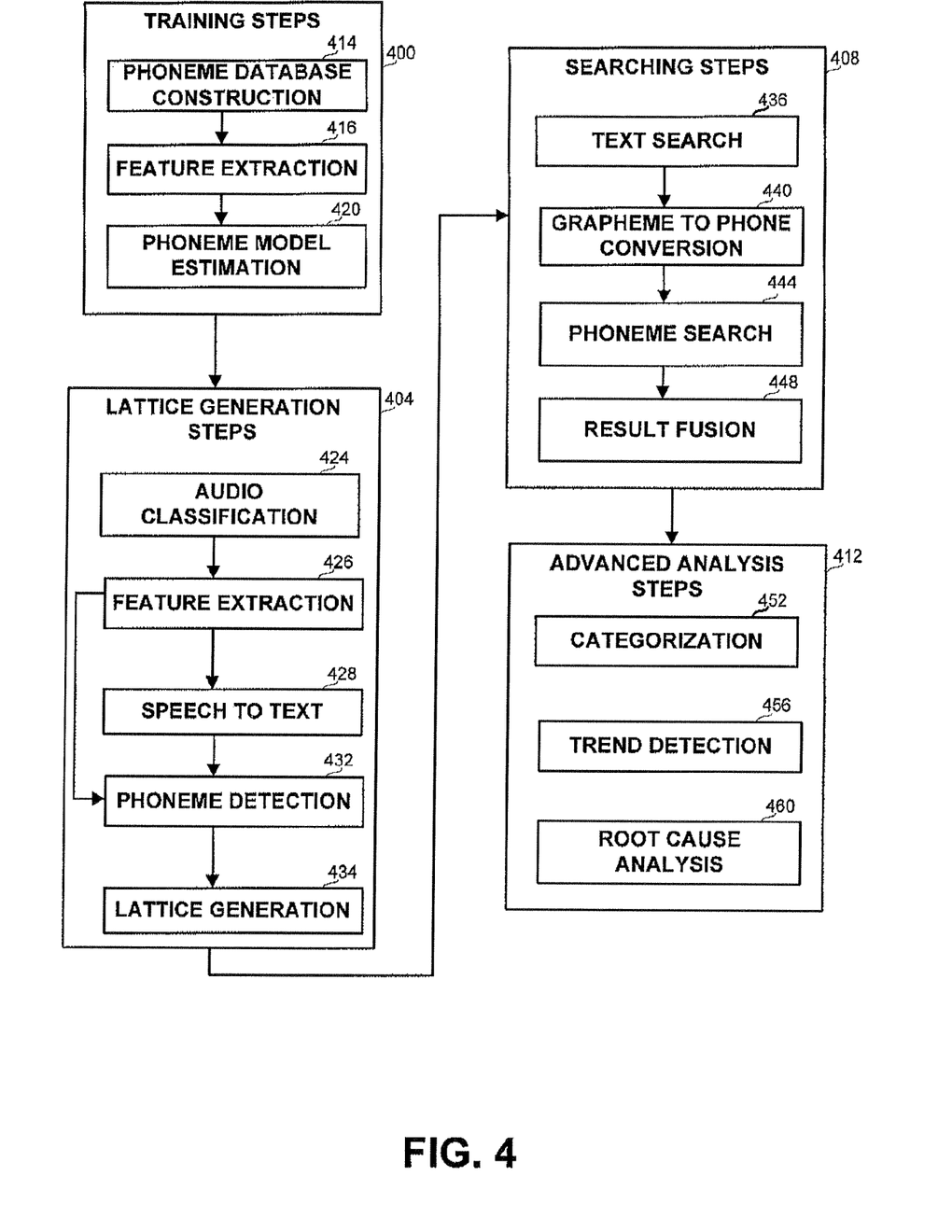
FIG. 4 is a schematic flowchart of the main steps in the methods of the current disclosure.

Referring now to FIG. 3 and FIG. 4, showing flowchart and block diagram of preferred embodiments of the disclosed methods and apparatus.

The apparatus preferably comprises one or more computing platforms, executing components for carrying out the disclosed steps. The computing platform can be a general purpose computer such as a personal computer, a mainframe computer, or any other type of computing platform that is provisioned with a memory device (not shown), a CPU or microprocessor device, and several I/O ports (not shown). The components are preferably components comprising one or more collections of computer instructions, such as libraries, executables, modules, or the like, programmed in any programming language such as C, C++, C#, Java or others, and developed under any development environment, such as Net, J2EE or others. Alternatively, the apparatus and methods can be implemented as firmware ported for a specific processor such as digital signal processor (DSP) or microcontrollers, or can be implemented as hardware or configurable hardware such as field programmable gate array (FPGA) or application specific integrated circuit (ASIC). The software components can be executed on one platform or on multiple platforms wherein data can be transferred from one computing platform to another via a communication channel, such as the Internet, Intranet, Local area network (LAN), wide area network (WAN), or via a device such as CDROM, disk on key, portable disk or others.

The apparatus may further comprise one or more storage devices. Each storage device can be an optical storage device such as a CD, a DVD, or a laser disk; a magnetic storage device such as a tape or a hard disk; a semiconductor storage device such as Flash device, memory stick, or the like, or any other type of storage device.

The output of the disclosed methods can be provided to a user using any associated device, such as a display device, a printed report, a vocal message heard through a device such as a speaker, or the like. The results can take any form, such as text, table, voice or others, and can further be sent my mail, e-mail, fax, phone, uploaded to an internet site, or provided in any other form.

Referring now to FIG. 3, showing a schematic block diagram of an apparatus according to the disclosed subject matter.

The apparatus comprises training components 304 and language model for constructing the knowledge base relevant for the organization 300, phonetic and text decoder 340 for indexing audio signals and creating lattices, search component 364 for searching within the lattices, and speech analytics components 386 for performing further analytics on the spotted words, terms and word combinations. Training components 304 receive audio signals and phonetic index 316 which comprises a collection of audio signals, divided into phonemes. The transcription uses phonetic lexicon 330 which provides the phoneme representation of written words. Training components 304 comprises feature extraction component 320 which performs time domain and frequency domain feature extraction from the audio. A vector of features is assigned to each frame in the audio signal, wherein a frame is typically between 4 and 100 mSec. The features preferably include cepstral and delta-cepstral coefficients (Cepstrum, DCespstrum), Mel-Frequency and Delta Mel-Frequency Cepstral Coefficients (MFCC, DMFCC, DDMFCC). Training components 304 further include phoneme model estimation 324 which generates statistical models for each phoneme. Each statistical model describes a phoneme as it appears in the specific environment. Multiple models are optionally generated for each phoneme, for example for male and female voices, the phonemes as captured using different types of communication equipment, or the like. The generated models are stored in phoneme model storage 328, as phoneme 1 model 332, phoneme 2 model 334, and so on until phoneme N model 336. Language model 300 includes dictionary 308 which comprises the relevant word lexicon, and N-gram models 312, wherein an n-gram is a sequence of words with the likelihood to appear together. For example, once the word "good" is identified, the probability of the combination "good morning" is greater than the likelihood of the combination "good boring". Phonetic and text decoder 340 uses language model 300 and phoneme model collection 328 and receives audio signals 341 as input. Phonetic and text decoder 340 comprises audio classifier 340, for classifying each audio frame is to one of the two categories—speech or non-speech. Then, preferably only the speech segments are decoded into a phoneme/word lattice representation. Phonetic and text decoder 340 further comprises feature extraction component 348, which is similar to feature extraction component 320, speech-to-text engine 352 and phoneme extraction engine 354. Speech-to-text engine 352 and phoneme extraction engine 354 are indexing engines, i.e. they output word or phoneme lattices, respectively from audio signals. Any part of the analyzed audio signal can be analyzed by S2T engine 352 or phoneme extraction engine 354. In one embodiment, if S2T engine 352 provides words with low certainty for an audio signal or part thereof, then the signal or part thereof can be passed to phoneme extraction engine 354. Since in some S2T engines, an estimate to the certainty of the results can be obtained faster than the results themselves, for example by estimating the quality of the input, then it is possible to save time by avoiding transcribing poor quality signals, and passing them to phoneme extraction engine 354. Phonetic and text decoder 340 further comprises phoneme/text lattice generator 356, for generating a combined lattice. In one embodiment, a word in the word lattice can be divided into its phonemes, thus generating also a full phoneme lattice. The result of phonetic and text decoder 340 is phonetic and text indexing representation 360, comprising the combined lattice, or any other data structure comprising essentially the same information. A preferred representation comprises for each audio segment or part thereof, one or more collections wherein each collection represents the one or more phoneme or word combinations that most likely match the speech segment or the part thereof.

Once audio signals 341 are indexed, search component 364 can search upon the indexed data. Search component 364 receives one or more words 361 to be searched. The words are optionally sent to grapheme to phoneme converter 368, which converts the words into a sequence of one or more phonemes. The words are also optionally sent to text search component 372. Text search component 372 searches for the words in the word lattice parts of representation 360. Alternatively, text search component 372 sends the words to grapheme to phoneme converter 368 which divides the words into phonemes. Optionally, only words that are not part of the language, are not found within representation 360, or are found in representation 360 with certainty lower than a predetermined threshold are sent to converter 368. In another alternative, all words in words to be searched 361, in addition to being searched for within the word lattice are also sent to converter 368. Once words are divided into phonemes by converter 368. The phoneme sequence is sent to phonetic sequence search component 376, which searches for the sequence within the phoneme parts of representation 360. Once phonetic search is enabled for words provided in text format, similar or closely-spelled words can be detected, thus increasing the likelihood of such words to be detected. The search results of the phoneme search performed by sequence search component 376 and the results of the text search performed by text search component 372 are fused by fusion component 380. Fusion component can fuse the results by selecting one or more results having the highest scores for each time range, select all results, select only results with certainty beyond a predetermined certainty, or any other combination. The fused search results are optionally output by search component 364. Alternatively, the search results can also be stored in audio meta data storage 384. Audio meta data 384 is used by speech analytics components 386. Speech analytics components 386 uses storage 388 optionally comprising the audio signals 341 or any other data related to the signals, to the organization, or to other entities such as customers, suppliers, associates or others. Speech analytics components 386 preferably include category ranking component 390 which assigns interactions into categories, optionally according to detected audio events, such as words or phrases, in the words found by search component 364 generated from audio signals 341. It will be appreciated that category ranking component 390 can also use other types of information, such as emotion events, interaction low parameters such as silence or more. The categories may be refined according to the results, the changing needs, new products or other factors by category refinement component 398. Speech analytics components 386 preferably includes trend detection component for detecting trends, changing subjects or issues within the audio signals, for example a raising number of times in which a competitor's name is mentioned, high frequency of complaints related to a certain product, or the like. Yet another optional component of speech analytics components 386 is root cause analysis 396 which is functional, for example, in locating the root cause for phenomenon such as new trends, raising numbers of complaints or the like. The analytics results output are output in any required format, such as graphical representation, textual representation, or the like. The results can be output as a report, in response to a query or in any other form.

Referring now to FIG. 4, showing a flowchart of the main steps in the disclosed methods. The methods include optional training steps 400 in which the characteristics of the language and the environments are studied to create a phoneme database representative of the environment; lattice generation steps 404 in which audio signals captured at the environment are indexed into a combined lattice which can later be searched; searching steps 408 in which one or more words are searched for within the lattice, whether as words or as phonemes; and optional advanced analysis steps 412 in which further analysis is performed using the search results obtained by search steps 408.

Training steps 400 include phoneme database construction step 414. The database comprises a vast collection of audio signals, transcribed into phonemes, so that each phoneme is associated with one or more audio segments in which the phoneme is uttered. Preferably, each phoneme should be uttered in as many ways as possible, including male and female voices, voices captured through all available communication channels, and the like. Once the database is available, audio signals captured in the organization, for example from phone conversations, audio parts of video conferences, recorded walk-in sessions, audio parts of web sessions or the like are received. The audio signals are then divided into frames, and on step 416 features are extracted from the frames. The features preferably include cepstral and delta-cepstral coefficients (Cepstrum, DCesptrum), Mel-Frequency and Delta Mel-Frequency Cepstral Coefficients (MFCC, DMFCC, DDMFCC). On phoneme model estimation step 420, using the phoneme database constructed on step 414, models are estimated for each phoneme, e.g. by estimating the multi dimensional Hidden Markovian Model (HMM) or any other statistical model. All models for all phonemes are stored for example in a database.

Lattice generation steps 404 include audio classification step 424, in which the audio signals to be indexed are classified into vocal segments, and non-vocal segments, such as silence, music, background noises or the like. Preferably, only vocal segments are further processed. On feature extraction step 426, features are extracted from the vocal segments, similarly to feature extraction step 416 detailed above. The feature vectors are transferred to speech-to-text (S2T) step 428, in which the segments are transcribed into words, using also a language model relevant for the language, acoustic characteristics and other features of the environment and a S2T engine. Optionally, the S2T engine provides a certainty estimation either before or after providing the output text. If the certainty is lower than a predetermined threshold, then the words can be sent to phoneme detection step 432. Alternatively, the features can be initially sent also to phoneme detection step 432. Phoneme detection step 432 divides the input into phonemes, whether the features are originally sent to step 432 or the words are sent from S2T step 428. On step 434, a combined lattice is generated from the output of S2T step 428 and phoneme detection step 432. Optionally, the words within the combined lattice are also divided into a sequence of phonemes, in order to enable exclusively phonetic search.

Searching steps 408 receive the lattice generated by lattice generated steps 404, and one or more words or terms to be searched for within the lattice, to detect appearances in the indexed audio signals. Searching steps 408 comprise text search 436, in which the words to be searched are searched for in the text parts of the combined lattice. As a preliminary step, the word can be searched for within a dictionary that was used on speech to text step 428 for generating the word lattice, since if the word does not appear in the dictionary, it would not appear in the lattice. If no results are obtained, if the obtained results are assigned a certainty level below a predetermined threshold, or as a general practice, the words are optionally also sent to grapheme to phoneme step 440 in which the words are divided into one or more sequences of phonemes. Grapheme to phoneme step 440 uses either a translation dictionary indicating for each word its phonemic structure, or a Text to Phoneme (TTP) model which translates words to phonemes based on grammatical rules, for example a rule indicating that "s" before "u" sounds like "sh". A TTP model enables receiving results of Grapheme to phoneme step 440 also for new words which did not appear in the dictionary at the time the word lattice was constructed.

The phoneme sequence is then sent to phoneme search step 444 in which the phoneme sequences are searched for within the phonemic parts of the combined lattice.

The sequence is optionally searched in the parts initially created as phonemic parts within the lattice, as well as on the parts generated on S2T step 428 and divided into phonemes. On fusion step 448, the results of text search step 436 and phoneme search step 444 are fused. Optionally, the results having the higher certainty scores are selected. Alternatively, only results having a certainty score above a predetermined threshold are selected, or any other selection scheme can be applied. The results are preferably stored in storage such as a database.

Once words are found, advanced analysis steps 412 are optionally executed. The steps can include any one or more of the steps detailed below, or any other analyses which utilize audio signals, meta data associated with the audio signals or with the organization, or terms detected in the audio signal. Advanced analysis steps 412 comprise categorization step 452 in which audio signals are assigned to predetermined categories, trend detection step 456 in which trends are detected within the audio signal, according to time, location, subjects in the analyzed interactions or the like. Trend detection step 456 optionally uses statistical methods in order to pinpoint word/phrases/sentences that present information about the changes in category frequency or in other measured factor. Advanced analysis steps 412 further comprise root cause analysis step 460 in which the reason for the trends, for the categorization or for other phenomenon are detected. Advanced analysis steps 412 can include additional components, such as clustering components which divides the audio signal into ad-hoc categories rather than into predetermined categories, a link analysis component which finds the links and correlations between phrases, a hidden pattern analysis component which finds hidden patterns and relations within phrases or contextual analysis components which summarize interactions (or more specifically the phrases the make up the interaction).

The disclosed method and apparatus receive a multiplicity of audio signals, index the signals and generate a combined lattice comprising both phoneme lattice parts and word lattice parts, for enhanced searching. Generating a combined lattice enable enhanced efficiency in constructing the lattice, beyond the efficiency and quality that can be achieved if separate lattices are to be constructed and searched.

Searching for a word either in a word lattice or in a phoneme lattice, enables the detection of words or terms even in audio signals of sub-optimal quality. Further, such dual search can enable the detection of closely-spelled words, and thus provides for detecting a word even if it is misspelled by a user. It will be appreciated by a person skilled in the art that multiple additions, enhancements and alternatives can be devised for the disclosure without deviating from its spirit. Such changes and enhancements are covered by the disclosed subject matter. For example, if a match having a certainty level beyond a predetermined level is not found, similar words, for example words reached by changing one or more letters in the original words can be searched for, in order to overcome typing errors. In yet another alternative, the word can be searched as-is, as well as additional searched performed for similar words or words that sound similar but are spelled differently, and the best one or more match will be selected. The best matches can be fused or selected using, for example, dynamic programming techniques which can combine results obtained for multiple words. It will be further appreciated that the disclosed invention can further comprise capturing Structure and acts described herein are replaceable by equivalents, which perform the same function, even if the structure or acts are different, as known in the art. Therefore, only the elements and limitations as used in the claims limit the scope of the invention. When used in the following claims, the terms "comprise", "include", "have" and their conjugates mean "including but not limited to".

The invention claimed is:

1. An apparatus for detecting an at least one word in an at least one audio signal, the apparatus comprising a computing platform executing:

a phonetic and text decoding component for generating from the at least one audio signal a combined lattice, the combined lattice comprising an at least one text part and an at least one phoneme part, the phonetic and text decoding component comprising:

a quality monitoring component for obtaining a quality assessment of multiple parts of the at least one audio signal;

a speech to text engine for detecting an at least one indexed word from an at least one first part of the at least one audio signal, the at least one first part having high quality;

a phoneme detection engine for detecting an at least one indexed phoneme from an at least one second part of the at least one audio signal, the at least one second part having lower quality than the at least one first part; and     a phoneme and text lattice generator for generating a combined lattice from the at least one indexed word and the at least one indexed phoneme; and a search component for searching for the at least one word within the combined lattice, the search component comprising:

a text search component for searching for the at least one word within the at least one text part of the combined lattice and generating an at least one first search result;

a grapheme to phoneme converter for extracting an at least one phoneme from the at least one word;

a phonetic sequence search component for searching for the at least one phoneme within the at least one phoneme part of the combined lattice and generating an at least one second search result; and     a fusion component for fusing the at least one first search result with the at least one second search result to obtain a fused result.

2. The apparatus of claim 1 wherein the at least one text part of the combined lattice is further divided into phonemes.

3. The apparatus of claim 1 further comprising a training component for generating an at least one phoneme model to be used by the phonetic and text decoding component and the search component.

4. The apparatus of claim 1 further comprising an at least one speech analytics component for performing advanced analysis on the fused result.

5. The apparatus of claim 4 wherein the at least one speech analytics component comprises an at least one item selected from the group consisting of: a category ranking component; a trend detection component; a link analysis component; a hidden pattern analysis component; a contextual analysis component; and a root cause analysis component for detecting causes of phenomenon exhibited by at least one word or term detected in the at least one audio signal.

6. The apparatus of claim 1 further comprising a storage device for storing the combined lattice.

7. The apparatus of claim 1 further comprising
a capturing or logging component for capturing the at least one audio signal; and
a presentation device for outputting the at least one first search result fused with the at least one second search result.

8. The apparatus of claim 1 further comprising a quality monitoring component for monitoring an at least one aspect of at least one item selected from the group consisting of: a participant in the audio signal, a product, and a line of products.

9. The apparatus of claim 1 wherein the phonetic sequence search component searches for the at least one phoneme within the at least one phoneme part of the combined lattice subject to the absence or low certainty of the at least one first search result.

10. A method for detecting an at least one word in an at least one audio signal, the method comprising:

lattice generation steps for generating from the at least one audio signal a combined lattice, the combined lattice comprising an at least one text part and an at least one phoneme part, the lattice generation steps comprising:

obtaining quality assessments of multiple parts of the at least one audio signal;

performing speech to text analysis on an at least one first part of the at least one audio signal, to detect an at least one indexed word, the at least one first part having high quality;

performing phoneme detection on an at least one second part of the at least one audio signal, to detect an at least one indexed phoneme, the at least one first part having lower quality than the at least one first part; and         generating a combined lattice from the at least one indexed word and the at least one indexed phoneme; and searching steps for searching for the at least one word within the combined lattice, the searching steps comprising:

searching for the at least one word within the at least one text part of the combined lattice and generating an at least one first search result if the at least one word was found within the at least one text part of the combined lattice;

converting the at least one word into an at least one phoneme;

searching for the at least one phoneme within the at least one phoneme part of the combined lattice and generating an at least one second search result if the at least one phoneme was found within the at least one phoneme part of the combined lattice; and         fusing the at least one first search result with the at least one second search result to obtain a fused result.

11. The method of claim 10 further comprising a step of searching the at least one word in a dictionary.

12. The method of claim 10 wherein converting the at least one word into an at least one phoneme is done using a rule-based text-to-phoneme model.

13. The method of claim 10 further comprising the step of dividing the at least one indexed word into phonemes.

14. The method of claim 10 further comprising a training step for generating an at least one phoneme model to be used by the lattice generation steps and the search steps.

15. The method of claim 10 further comprising an at least one speech analytics step for performing advanced analysis on the fused result.

16. The method of claim 15 wherein the at least one speech analytics step comprises an at least one item selected from the group consisting of: categorization; trend detection; root cause analysis for detecting causes of phenomenon exhibited by at least one word or term detected in the at least one audio signal; link analysis; hidden pattern analysis and contextual analysis.

17. The method of claim 10 wherein searching for the at least one phoneme within the at least one phoneme part of the combined lattice is subject to the absence or low certainty of the at least one first search result.

18. A method for detecting an at least one word in an at least one audio signal, the method comprising:

lattice generation steps for generating from the at least one audio signal a combined lattice, the combined lattice comprising an at least one text part and an at least one phoneme part, the lattice generation steps comprising:

performing speech to text analysis on an at least one part of the at least one audio signal, to detect an at least one indexed word, and to obtain a certainty score associated with the at least one indexed word;

performing phoneme detection on an at least one second part of the at least one audio signal, the at least one second part containing the at least one indexed word associated with a certainty score below a predetermined threshold, to detect an at least one indexed phoneme; and generating a combined lattice from the at least one indexed word and the at least one indexed phoneme; and searching steps for searching for the at least one word within the combined lattice, the searching steps comprising:

searching for the at least one word within the at least one text part of the combined lattice and generating an at least one first search result if the at least one word was found within the at least one text part of the combined lattice;

converting the at least one word into an at least one phoneme;

searching for the at least one phoneme within the at least one phoneme part of the combined lattice and generating an at least one second search result if the at least one phoneme was found within the at least one phoneme part of the combined lattice; and fusing the at least one first search result with the at least one second search result to obtain a fused result.

* * * * *